United States Patent
Wu et al.

(10) Patent No.: US 11,310,130 B2
(45) Date of Patent: Apr. 19, 2022

(54) HEARTBEAT INFORMATION SENDING METHOD AND APPARATUS, AND HEARTBEAT SENDING NODE

(71) Applicant: HUAWEI TECHNOLOGIES CO., LTD., Guangdong (CN)

(72) Inventors: Wei Wu, Hangzhou (CN); Siyi Zhou, Shenzhen (CN); Xihua Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 16/127,863

(22) Filed: Sep. 11, 2018

(65) Prior Publication Data

US 2019/0028366 A1 Jan. 24, 2019

Related U.S. Application Data

(63) Continuation of application No. PCT/CN2017/076189, filed on Mar. 9, 2017.

(30) Foreign Application Priority Data

Mar. 11, 2016 (CN) .......................... 201610140075.9

(51) Int. Cl.
*H04L 12/26* (2006.01)
*H04W 76/25* (2018.01)
(Continued)

(52) U.S. Cl.
CPC ........ *H04L 43/02* (2013.01); *H04L 29/08612* (2013.01); *H04L 43/10* (2013.01);
(Continued)

(58) Field of Classification Search
CPC .. H04W 76/25; H04L 29/08612; H04L 43/02; H04L 43/10; H04L 45/026;
(Continued)

(56) References Cited

U.S. PATENT DOCUMENTS 6,871,222 B1   3/2005   Frank et al.
7,039,694 B2 * 5/2006   Kampe ............... H04L 41/0618
                                                  709/216

(Continued)

FOREIGN PATENT DOCUMENTS

CN    101471845 A    7/2009
CN    102137017 A    7/2011
(Continued)

OTHER PUBLICATIONS

International Search Report, dated May 31, 2017, in International Application No. PCT/CN2017/076189 (4 pp.).

(Continued)

*Primary Examiner* — Thu V Nguyen
*Assistant Examiner* — Angela M Widhalm de Rodriguez
(74) *Attorney, Agent, or Firm* — Fish & Richardson P.C.

(57) ABSTRACT

The present disclosure provides a heartbeat information sending method and apparatus, a heartbeat information processing method and apparatus, and a node. The method includes: determining heartbeat receiving nodes in which at least two follower data blocks corresponding to at least two leader data blocks in a heartbeat sending node are located; and when the heartbeat receiving nodes are a same node, sending heartbeat information of the heartbeat sending node to the heartbeat receiving node, where the heartbeat information of the heartbeat sending node is heartbeat information obtained after respective heartbeat information of the at least two leader data blocks are combined.

8 Claims, 6 Drawing Sheets

(51) Int. Cl.

| | |
|---|---|
| *H04L 29/08* | (2006.01) |
| *H04L 29/12* | (2006.01) |
| *H04L 12/751* | (2013.01) |
| *H04L 12/801* | (2013.01) |
| *H04L 43/02* | (2022.01) |
| *H04L 43/10* | (2022.01) |
| *H04L 67/5683* | (2022.01) |
| *H04L 61/2553* | (2022.01) |
| *H04L 67/145* | (2022.01) |
| *H04L 45/02* | (2022.01) |
| *H04L 67/55* | (2022.01) |
| *H04L 47/12* | (2022.01) |

(52) U.S. Cl.
CPC .......... *H04L 45/026* (2013.01); *H04L 47/12* (2013.01); *H04L 61/2553* (2013.01); *H04L 67/145* (2013.01); *H04L 67/26* (2013.01); *H04L 67/2857* (2013.01); *H04W 76/25* (2018.02)

(58) Field of Classification Search
CPC ... H04L 47/12; H04L 61/2553; H04L 67/145; H04L 67/26; H04L 67/2857
See application file for complete search history.

(56) References Cited

U.S. PATENT DOCUMENTS

| | | | | |
|---|---|---|---|---|
| 7,111,057 | B1* | 9/2006 | Sherman | H04L 63/14 709/223 |
| 7,287,180 | B1* | 10/2007 | Chen | G06F 11/2033 714/11 |
| 7,653,668 | B1 | 1/2010 | Shelat et al. | |
| 8,533,231 | B2* | 9/2013 | Aizman | G06F 16/182 707/793 |
| 8,719,225 | B1* | 5/2014 | Rath | G06F 16/27 707/634 |
| 9,774,401 | B1* | 9/2017 | Borrill | H04L 9/0852 |
| 10,567,499 | B1* | 2/2020 | Chen | G06F 11/2069 |
| 2006/0002292 | A1* | 1/2006 | Chang | H04L 45/02 370/225 |
| 2006/0002386 | A1 | 1/2006 | Yik et al. | |
| 2010/0115078 | A1* | 5/2010 | Ishikawa | G06F 16/10 709/223 |
| 2013/0204990 | A1* | 8/2013 | Skjolsvold | G06F 16/278 709/223 |
| 2013/0290249 | A1* | 10/2013 | Merriman | G06F 16/278 707/610 |
| 2014/0108339 | A1* | 4/2014 | Marsden | G06F 16/273 707/611 |
| 2015/0278397 | A1* | 10/2015 | Hendrickson | G06F 16/9024 707/798 |
| 2015/0281128 | A1* | 10/2015 | Sindhu | H04L 12/4633 370/355 |
| 2016/0034490 | A1* | 2/2016 | Woo | G06F 16/27 707/634 |
| 2016/0034555 | A1* | 2/2016 | Rahut | G06F 16/951 707/634 |
| 2016/0110993 | A1* | 4/2016 | Marlatt | G08B 13/19682 340/4.33 |
| 2017/0262519 | A1* | 9/2017 | Horowitz | G06F 11/0709 |
| 2018/0027048 | A1* | 1/2018 | Zhang | H04L 67/26 707/827 |
| 2018/0302861 | A1* | 10/2018 | Zhao | H04W 52/0216 |

FOREIGN PATENT DOCUMENTS

| | | | | |
|---|---|---|---|---|
| CN | 102546686 | A | | 7/2012 |
| CN | 103207867 | A | | 7/2013 |
| CN | 103532784 | A | | 1/2014 |
| CN | 103945455 | A | | 7/2014 |
| CN | 107046552 | A * | 8/2017 | .......... H04L 67/145 |
| CN | 103207867 | B * | 4/2019 | .......... G06F 16/182 |
| EP | 2347563 | | | 7/2011 |
| WO | 2010038149 | A2 | | 4/2010 |
| WO | WO-2010038149 | A2 * | 4/2010 | ......... H04L 67/1097 |
| WO | WO-2011009109 | A2 * | 1/2011 | .......... G01S 13/876 |
| WO | WO-2014183708 | A1 * | 11/2014 | ......... G06F 16/1827 |

OTHER PUBLICATIONS

Cheuk, K.-W. Roger et al., "Island Multicast: The Combination of IP Multicast with Application-Level Multicast," 2004 IEEE International Conference on Communications, vol. 3, Jun. 20, 2004, pp. 1441-1445, XP010710499.
Jain, Amit et al., "Failure Detection and Membership Management in Grid Environments," Proceedings of the Fifth IEEE/ACM International Workshop on Grid Computing, Pittsburgh, PA, USA, Nov. 8, 2004, XP058329220 (9 pp.).
Extended European Search Report, dated Jan. 25, 2019, in European Application No. 17762546.4 (34 pp.).
Wiesmann, M. et al., "Understanding replication in databases and distributed systems," Distributed Computing Systems, 2000. Proceedings.20th International Conference on Taipei, Taiwan Apr. 10-13, 2000, Apr. 10, 2000, XP010379058, pp. 464-474.
Bandyopadhyay, S. et al., "A connection management protocol to support multimedia traffic in ad hoc wireless networks with directional antenna," Multimedia and Expo, 2001.ICME 2001.IEEE International Conference on Advanced Distributed Learning, Aug. 22, 2001, XP010662019, pp. 1240-1243.
Partial Supplementary European Search Report, dated Nov. 20, 2018, in European Application No. 17762546.4 (24 pp.).
EPO Communication pursuant to Article 94(3) EPC issued in European Application No. 17762546.4 dated May 6, 2020, 13 pages.
Office Action issued in Chinese Application No. 201610140075.9 dated Nov. 3, 2020, 6 pages (with English translation).
Office Action issued in Chinese Application No. 201610140075.9 dated Apr. 14, 2020, 17 pages (with English translation).

* cited by examiner

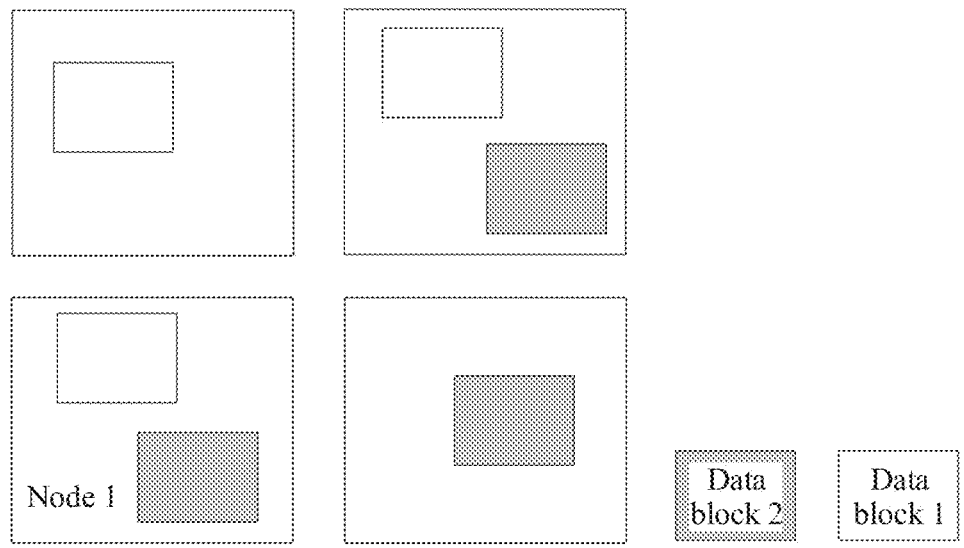

FIG. 3

Determine heartbeat receiving nodes in which at least two follower data blocks corresponding to at least two leader data blocks in a heartbeat sending node are located  /40

When the heartbeat receiving nodes are a same node, send heartbeat information of the heartbeat sending node to the heartbeat receiving node, where the heartbeat information of the heartbeat sending node is heartbeat information obtained after respective heartbeat information of the at least two leader data blocks are combined  /41

FIG. 4

HEARTBEAT INFORMATION SENDING METHOD AND APPARATUS, AND HEARTBEAT SENDING NODE

CROSS-REFERENCE TO RELATED APPLICATIONS

This application is a continuation of International Application No. PCT/CN2017/076189, filed on Mar. 9, 2017, which claims priority to Chinese Patent Application No. 201610140075.9, filed on Mar. 11, 2016. The disclosures of the aforementioned applications are hereby incorporated by reference in their entireties.

TECHNICAL FIELD

The present disclosure relates to the field of communications technologies, and in particular, to a heartbeat information sending method and apparatus, a heartbeat information processing method and apparatus, and a node.

BACKGROUND

Currently, data backup is a general method for improving availability of a distributed database system. To ensure database consistency, data backup needs to be consistent backup. A consensus algorithm needs to be used in consistent backup. Common consensus algorithms include a Paxos algorithm, a Raft algorithm, and the like. Further, in the distributed database system, to improve a speed and a throughput of data replication in a consistent backup process, when data backup is performed, data is usually divided into more than one data blocks for replication.

In a process of performing replication backup on a data block by using a consensus algorithm, in order to implement automatic fault recovery and fault tolerance, nodes participating in the consensus algorithm need to know status information of data blocks of each other. Therefore, the nodes need to send heartbeat information to each other to notify the status information of the data blocks in the nodes. As shown in FIG. 1, in the prior art, a leader data block sends heartbeat information to a follower data block corresponding to the leader data block. When there is a leader data block in a node, the node combines heartbeat information of all data blocks in the node, and sends combined heartbeat information to other nodes in which all data blocks that are located in same data block groups as the data blocks in the node are located. Nodes having a same data block type are nodes in which data blocks storing same data are located.

However, in a system, a node sends heartbeat information to all other nodes that include a same data block. In addition to a leader data block, the node further includes a data block that is not a leader. Therefore, the node sends a large quantity of useless heartbeat information after heartbeat information is combined. As shown in FIG. 2, a data block 1 in a node 1 is a leader, and a data block 2 is not a leader. Because both the node 1 and a node 3 include the data block 2, the node 1 sends heartbeat information to the node 3. However, because the data block 2 in the node 1 is not a leader, the heartbeat information is useless heartbeat information. Useless heartbeat information results in an increase in a quantity of heartbeat information. Consequently, system performance is affected.

SUMMARY

Embodiments of the present disclosure provide a heartbeat information sending method and apparatus, a heartbeat information processing method and apparatus, and a node, to prevent a node from sending useless heartbeat information, so as to reduce a quantity of heartbeat information and prevent network congestion.

A first aspect of the embodiments of the present disclosure provides a heartbeat information sending method, the method is performed by a heartbeat sending node, and the method includes:

determining heartbeat receiving nodes in which at least two follower data blocks corresponding to at least two leader data blocks in the heartbeat sending node are located; and when the heartbeat receiving nodes are a same node, sending heartbeat information of the heartbeat sending node to the heartbeat receiving node, where the heartbeat information of the heartbeat sending node is heartbeat information obtained after respective heartbeat information of the at least two leader data blocks are combined.

In this embodiment of the present disclosure, heartbeat receiving nodes in which at least two follower data blocks corresponding to at least two leader data blocks in a heartbeat sending node are located are determined. When the heartbeat receiving nodes are a same node, heartbeat information obtained after respective heartbeat information of the at least two leader data blocks are combined is sent to the heartbeat receiving node. This prevents the heartbeat sending node from combining heartbeat information of all data blocks (including a leader data block and a follower data block) in the node and from sending combined heartbeat information to other nodes in which all data blocks that are located in same data block groups as the data blocks in the node are located, so as to reduce a quantity of heartbeat information and prevent network congestion.

With reference to the first aspect, in a first possible implementation of the first aspect, the heartbeat information of the heartbeat sending node carries data block group identifiers used to identify data block groups in which the at least two leader data blocks are respectively located, and the data block group identifiers are respectively used to indicate that the leader data blocks of the data block groups are located in the heartbeat sending node.

A second aspect of the embodiments of the present disclosure provides a heartbeat information sending method, the method is performed by a heartbeat sending node, and the method includes: determining a heartbeat receiving node in which a follower data block corresponding to a current leader data block in the heartbeat sending node is located, where a data block group in which the current leader data block is located includes the follower data block; and sending heartbeat information of the heartbeat sending node to the heartbeat receiving node, where the heartbeat information of the heartbeat sending node carries a data block group identifier used to identify the data block group, and the data block group identifier is used to indicate that the leader data block in the data block group is located in the heartbeat sending node.

In the prior art, heartbeat information sent by a heartbeat sending node carries a node identifier of the heartbeat sending node, and a heartbeat receiving node has a node identifier of a node in which a leader data block corresponding to a follower data block in the heartbeat receiving node is located. When the heartbeat receiving node receives the heartbeat information, if the node identifier carried in the heartbeat information is the same as the node identifier corresponding to the follower data block, the follower data block receives the heartbeat information and responds to the heartbeat information. If a leader data block in a data block group in which the follower data block is located changes, that is, a data block that is located in the data block group and that is in another heartbeat sending node becomes the leader data block of the data block group, but the node identifier corresponding to the follower data block in the heartbeat receiving node does not change, when the another heartbeat sending node sends heartbeat information to the heartbeat receiving node, because a node identifier that is of the another heartbeat sending node and that is carried in the heartbeat information is different from the node identifier corresponding to the follower data block, the follower data block ignores the heartbeat information. Consequently, the follower data block is in isolation from the another heartbeat sending node.

In this embodiment of this application, data block group identifiers used to identify data block groups in which at least two leader data blocks are respectively located are carried in heartbeat information of a heartbeat sending node, so that after receiving the heartbeat information carrying the data block group identifiers, a heartbeat receiving node updates, to an identifier used to identify the heartbeat sending node, a node identifier corresponding to a follower data block, so as to prevent the follower data block from being in isolation from the heartbeat sending node.

With reference to the second aspect, in a first possible implementation of the second aspect, the sending heartbeat information of the heartbeat sending node to the heartbeat receiving node includes: sending the heartbeat information of the heartbeat sending node to the heartbeat receiving node when the heartbeat receiving node is a node that does not respond to an election request of the current leader data block. In this embodiment of the present disclosure, the heartbeat information is sent to the heartbeat receiving node when the heartbeat receiving node is the node that does not respond to the election request of the current leader data block, so that a quantity of heartbeat information is reduced.

A third aspect of the embodiments of the present disclosure provides a heartbeat information processing method, the method is performed by a heartbeat receiving node, and the method includes: receiving heartbeat information from a heartbeat sending node, where the heartbeat information of the heartbeat sending node carries a data block group identifier used to identify a data block group; determining a follower data block that is located in the data block group and that is in the heartbeat receiving node; and updating, to an identifier used to identify the heartbeat sending node, a node identifier corresponding to the follower data block, where the node identifier is used to identify a node in which a leader data block in the data block group is located.

In this embodiment of the present disclosure, after receiving heartbeat information carrying a data block group identifier used to identify a data block group, a heartbeat receiving node determines a follower data block that is located in the data block group and that is in the heartbeat receiving node, and updates, to an identifier used to identify the heartbeat sending node, a node identifier corresponding to the follower data block, so as to prevent the follower data block from being in isolation from the heartbeat sending node.

A fourth aspect of the embodiments of the present disclosure provides a heartbeat information sending apparatus, including:

a determining unit, configured to determine heartbeat receiving nodes in which at least two follower data blocks corresponding to at least two leader data blocks in the heartbeat sending node are located; and a sending unit, configured to: when the heartbeat receiving nodes are a same node, send heartbeat information of the heartbeat sending node to the heartbeat receiving node, where the heartbeat information of the heartbeat sending node is heartbeat information obtained after respective heartbeat information of the at least two leader data blocks are combined.

With reference to the fourth aspect, in a first possible implementation of the fourth aspect, the heartbeat information of the heartbeat sending node carries data block group identifiers used to identify data block groups in which the at least two leader data blocks are respectively located, and the data block group identifiers are respectively used to indicate that the leader data blocks of the data block groups are located in the heartbeat sending node.

A fifth aspect of the embodiments of the present disclosure provides a heartbeat information sending apparatus, including:

a determining unit, configured to determine a heartbeat receiving node in which a follower data block corresponding to a current leader data block in the heartbeat sending node is located, where a data block group in which the current leader data block is located includes the follower data block; and a sending unit, configured to send heartbeat information of the heartbeat sending node to the heartbeat receiving node, where the heartbeat information of the heartbeat sending node carries a data block group identifier used to identify the data block group, and the data block group identifier is used to indicate that the leader data block in the data block group is located in the heartbeat sending node.

With reference to the fifth aspect, in a first possible implementation of the fifth aspect, the sending unit is configured to:

send the heartbeat information of the heartbeat sending node to the heartbeat receiving node when the heartbeat receiving node is a node that does not respond to an election request of the current leader data block.

A sixth aspect of the embodiments of the present disclosure provides a heartbeat information processing apparatus, including:

a receiving unit, configured to receive heartbeat information from a heartbeat sending node, where the heartbeat information of the heartbeat sending node carries a data block group identifier used to identify a data block group;

a determining unit, configured to determine a follower data block that is located in the data block group and that is in the heartbeat receiving node; and an update unit, configured to update, to an identifier used to identify the heartbeat sending node, a node identifier corresponding to the follower data block, where the node identifier is used to identify a node in which a leader data block in the data block group is located.

A seventh aspect of the embodiments of the present disclosure provides a heartbeat sending node, including a processor, a transmitter, and a communications bus, where the processor and the transmitter communicate with each other by using the communications bus;

the processor is configured to determine heartbeat receiving nodes in which at least two follower data blocks corresponding to at least two leader data blocks in the heartbeat sending node are located; and the transmitter is configured to: when the heartbeat receiving nodes are a same node, send heartbeat information of the heartbeat sending node to the heartbeat receiving node, where the heartbeat information of the heartbeat sending node is heartbeat information obtained after respective heartbeat information of the at least two leader data blocks are combined.

With reference to the seventh aspect, in a first possible implementation of the seventh aspect, the heartbeat information of the heartbeat sending node carries data block group identifiers used to identify data block groups in which the at least two leader data blocks are respectively located, and the data block group identifiers are respectively used to indicate that the leader data blocks of the data block groups are located in the heartbeat sending node.

An eighth aspect of the embodiments of the present disclosure provides a heartbeat sending node, including a processor, a transmitter, and a communications bus, where the processor and the transmitter communicate with each other by using the communications bus;

the processor is configured to determine a heartbeat receiving node in which a follower data block corresponding to a current leader data block in the heartbeat sending node is located, where a data block group in which the current leader data block is located includes the follower data block; and the transmitter is configured to send heartbeat information of the heartbeat sending node to the heartbeat receiving node, where the heartbeat information of the heartbeat sending node carries a data block group identifier used to identify the data block group, and the data block group identifier is used to indicate that the leader data block in the data block group is located in the heartbeat sending node.

With reference to the eighth aspect, in a first possible implementation of the eighth aspect, the transmitter is configured to:

send the heartbeat information of the heartbeat sending node to the heartbeat receiving node when the heartbeat receiving node is a node that does not respond to an election request of the current leader data block.

A ninth aspect of the embodiments of the present disclosure provides a heartbeat receiving node, including a processor, a receiver, and a communications bus, where the processor and the receiver communicate with each other by using the communications bus;

the receiver is configured to receive heartbeat information from a heartbeat sending node, where the heartbeat information of the heartbeat sending node carries a data block group identifier used to identify a data block group; and the processor is configured to: determine a follower data block that is located in the data block group and that is in the heartbeat receiving node; and update, to an identifier used to identify the heartbeat sending node, a node identifier corresponding to the follower data block, where the node identifier is used to identify a node in which a leader data block in the data block group is located.

One or more technical solutions provided in the embodiments of the present disclosure have at least the following technical effects or advantages:

In the embodiments of the present disclosure, heartbeat receiving nodes in which at least two follower data blocks corresponding to at least two leader data blocks in a heartbeat sending node are located are determined. When the heartbeat receiving nodes are a same node, heartbeat information obtained after respective heartbeat information of the at least two leader data blocks are combined is sent to the heartbeat receiving node. This prevents the heartbeat sending node from combining heartbeat information of all data blocks (including a leader data block and a follower data block) in the node and from sending combined heartbeat information to other nodes in which all data blocks that are located in same data block groups as the data blocks in the node are located, so as to reduce a quantity of heartbeat information and prevent network congestion.

BRIEF DESCRIPTION OF DRAWINGS

FIG. 3 is a schematic diagram of a distributed database system that is applicable to an embodiment of the present disclosure:

FIG. 4 is a flowchart of a heartbeat information sending method according to an embodiment of the present disclosure;

DESCRIPTION OF EMBODIMENTS

Figure 1:
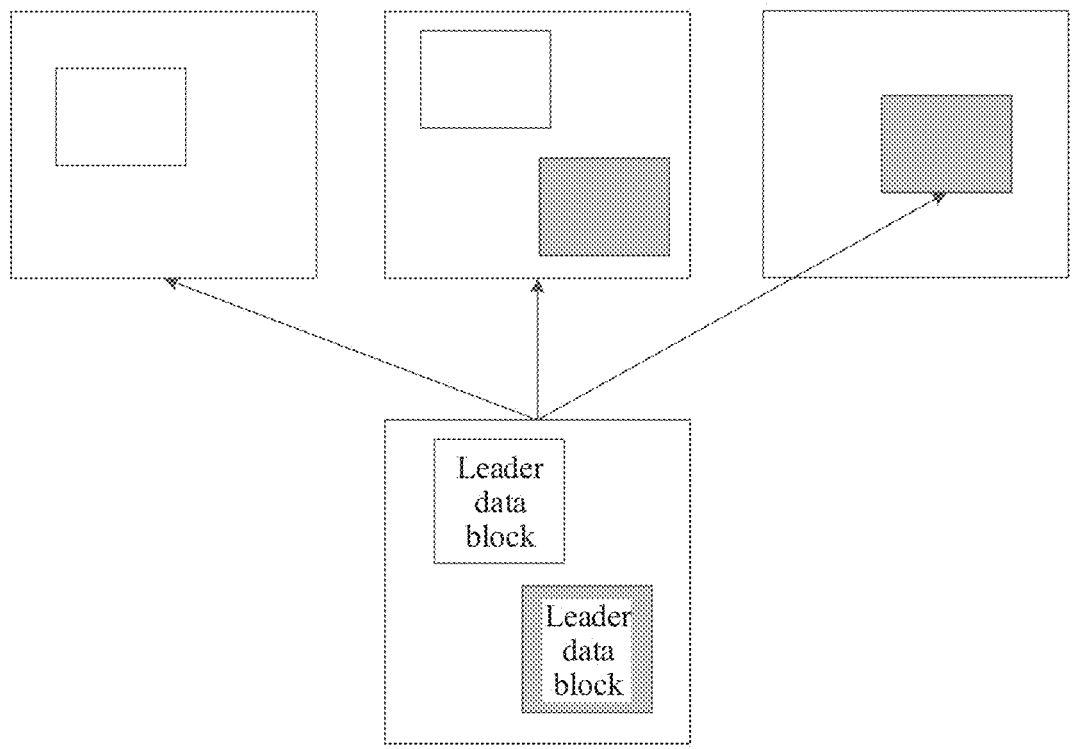
FIG. 1 is a schematic diagram of heartbeat information combination.
Figure 2:
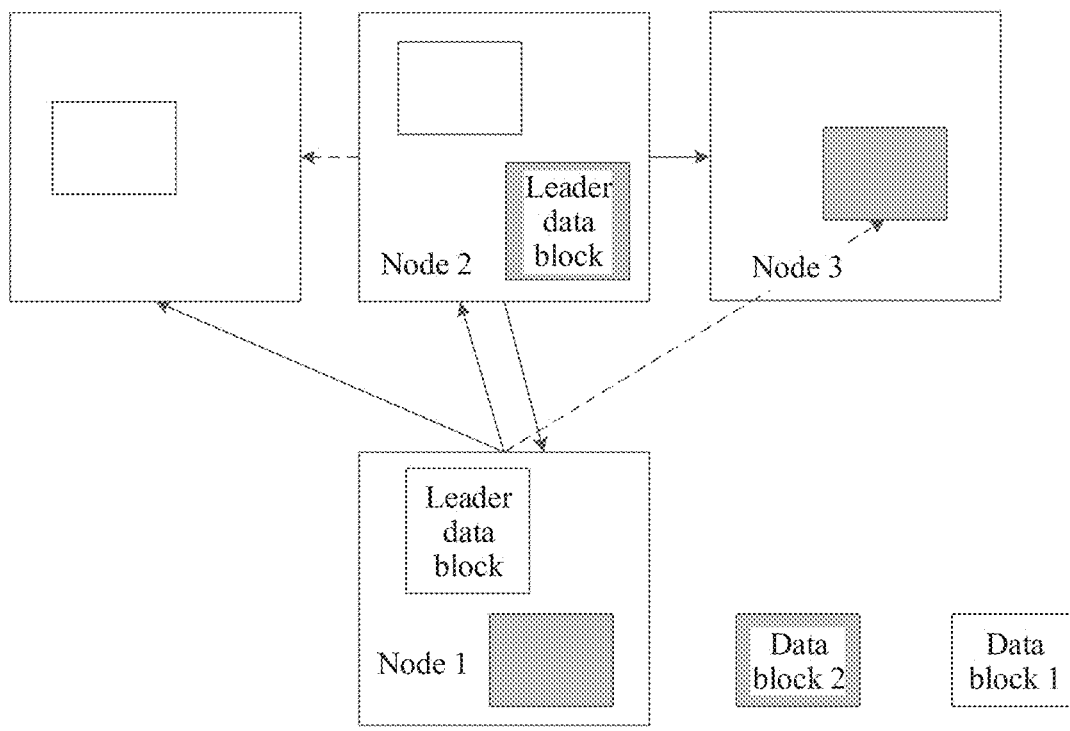
FIG. 2 is a schematic diagram of useless heartbeat information sent by a node.

Embodiments of the present disclosure provide a heartbeat information sending method and apparatus, a heartbeat information processing method and apparatus, and a node, to resolve a technical problem that a node sends useless heartbeat information in a distributed database system.

To make the objectives, technical solutions, and advantages of the embodiments of the present disclosure clearer, the following clearly describes the technical solutions in the embodiments of the present disclosure with reference to accompanying drawings in the embodiments of the present disclosure.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Referring to FIG. 3. FIG. 3 is a schematic diagram of a distributed database system that is applicable to an embodiment of the present disclosure. The distributed database system includes multiple nodes. Each node includes at least one data block. In the Background, it is mentioned that data is divided into more than one data blocks for replication. For example, data in a node 1 is divided into a data block 1 and a data block 2. The data block 1 is replicated, and the data block 2 is replicated. The distributed database system may have multiple data block groups. Each data block group has a unique data block group identifier and a unique leader data block. Leader data blocks of different data block groups may be located in a same node in the distributed database system, or may be located in different nodes in the distributed database system.

A consensus algorithm needs to be used in consistent backup. A Raft algorithm is used as an example. In the Raft algorithm, a unique leader data block in a data block group is elected, and another data block in the data block group is a follower data block. The leader data block is responsible for managing a log. All operations of adding a log and changing a status of a log are completed by using the leader data block. In the distributed database system, nodes participating in a consensus algorithm need to know status information of data blocks of each other. Therefore, a leader data block needs to send heartbeat information to a follower data block to notify status information of a node in which the leader data block is located.

The following describes in detail a heartbeat information sending method provided in an embodiment of the present disclosure.

Referring to FIG. 4, FIG. 4 is a flowchart of a heartbeat information sending method according to an embodiment of the present disclosure. The method includes the following content.

Step 40: Determine heartbeat receiving nodes in which at least two follower data blocks corresponding to at least two leader data blocks in a heartbeat sending node are located.

In a distributed database system, a heartbeat sending node maintains a set $leader_{raftnode}$ of at least two leader data blocks and a set $$S_{hearbeatnode} = \bigcup_{l \in leader_{raftnode}} node_l$$

of heartbeat receiving nodes, where $node_l$ indicates a set of nodes in which follower data blocks of a leader data block l are located. That is, if there are at least two leader data blocks in the heartbeat sending node, the set $S_{heartbeatnode}$ of the heartbeat receiving nodes includes an union set of nodes in which follower data blocks of leader data blocks in the at least two leader data blocks in the heartbeat sending node are located.

In step 40, the heartbeat sending node may determine the heartbeat receiving nodes by querying nodes included in a set $S_{heartbeatnode}$. That is, the heartbeat sending node determines the nodes included in the set $S_{heartbeatnode}$ as the heartbeat receiving nodes.

Step 41: When the heartbeat receiving nodes are a same node, send heartbeat information of the heartbeat sending node to the heartbeat receiving node, where the heartbeat information of the heartbeat sending node is heartbeat information obtained after respective heartbeat information of the at least two leader data blocks are combined.

In the distributed database system, when the heartbeat receiving nodes are the same node, that is, when the at least two follower data blocks are located in the same node, the heartbeat sending node combines the respective heartbeat information of the at least two leader data blocks to obtain combined heartbeat information, and sends the combined heartbeat information to a heartbeat receiving node, to reduce a quantity of heartbeat information.

It should be noted that, in addition to the leader data block, the heartbeat sending node may further include a follower data block that is located in another data block group. In the distributed database system, a status of a data block in the heartbeat sending node changes for a reason such as a node failure. One possible case is that the leader data block in the heartbeat sending node becomes a follower data block. Another possible case is that the follower data block in the heartbeat sending node becomes a leader data block. After the status of the data block in the heartbeat sending node changes, the heartbeat sending node updates the set $S_{heartbeatnode}$ of the nodes. Update steps are as follows:

Step 1: Determine all leader data blocks in the heartbeat sending node.

Step 2: Determine all follower data blocks of all the leader data blocks.

Step 3: Determine nodes in which all the follower data blocks are located.

Step 4: Update the heartbeat receiving nodes in the set $S_{heartbeatnode}$ according to the nodes in which all the follower data blocks are located.

In the prior art, after heartbeat information is combined, a follower data block in a node may be isolated by a leader data block. For example, as shown in graph a in FIG. 5, both a data block 1 and a data block 2 in a node 1 are leader data blocks, and a node 2 includes a data block 1 and a data block 2. After combining heartbeat information of the leader data block 1 and heartbeat information of the leader data block 2, the node 1 needs to send only one piece of heartbeat information to the node 2. The heartbeat information carries a node identifier of the node 1. A node identifier corresponding to the data block 1 in the node 2 is the node identifier of the node 1. If the node 2 receives the heartbeat information sent by the node 1, a follower data block 1 receives the heartbeat information and responds to the heartbeat information.

Figure 5:
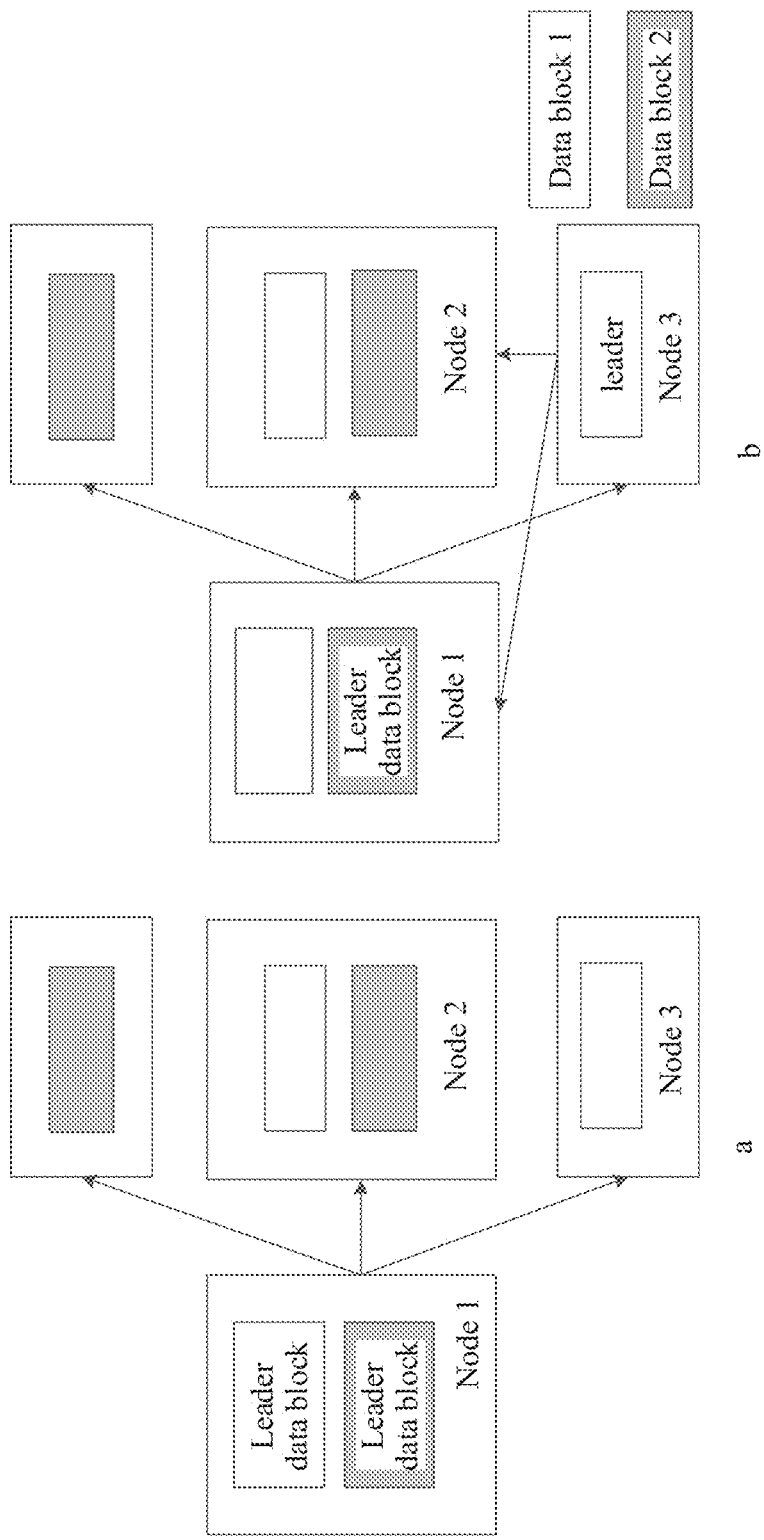
FIG. 5 is a schematic diagram in which a leader data block in a distributed database system changes.

As shown in graph b in FIG. 5, after a data block 1 in a node 1 changes from a leader data block to a follower data block, and a data block 1 in a node 3 becomes a leader data block of a data block group in which the data block 1 is located, if the node 1 continues to send heartbeat information to a node 2, because a node identifier corresponding to a data block 1 in the node 2 is still a node identifier of the node 1, when the node 2 receives the heartbeat information sent by the node 1, the data block 1 in the node 2 continues to regard the node 1 as a node in which the leader data block is located. However, when the node 2 receives heartbeat information sent by the node 3 (where the heartbeat information carries a node identifier of the node 3), because the node identifier of the node 3 is different from the node identifier corresponding to the data block 1 in the node 2, the data block 1 in the node 2 ignores the heartbeat information sent by the node 3. Consequently, the data block 1 in the node 2 is in isolation from the leader data block in the node 3.

Figure 6:
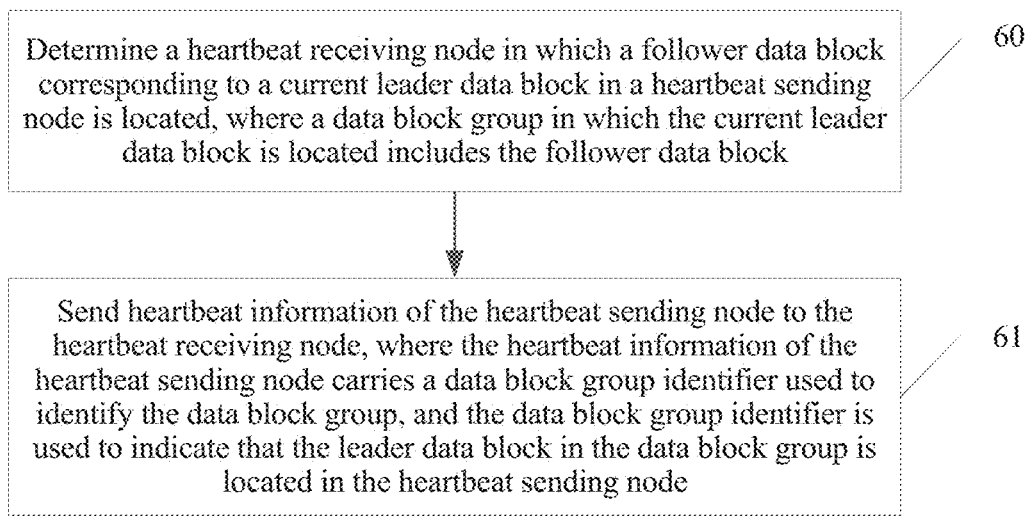
FIG. 6 is a flowchart of another heartbeat information sending method according to an embodiment of the present disclosure.

To resolve the foregoing technical problem, an embodiment of the present disclosure provides a heartbeat information sending method. As shown in FIG. 6, the method includes following content.

Step 60: Determine a heartbeat receiving node in which a follower data block corresponding to a current leader data block in the heartbeat sending node is located, where a data block group in which the current leader data block is located includes the follower data block.

In a distributed database system, for each data block participating in a Raft algorithm, a group node set $node_{raftnode}$ is maintained. $node_{raftnode}$ includes nodes in which all data blocks that have a same data block group identifier in the system are located. A format of each element in $node_{raftnode}$ is a tuple (raftgroupID, nodeID), where raftgroupID is a data block group identifier, and nodeID is a node identifier of a node in which a data block is located.

If a data block is elected to be a current leader data block, when a heartbeat receiving node is being determined, a corresponding $node_{raftnode}$ may be queried according to a data block group identifier of a data block group in which the current leader data block is located, and a node in $node_{raftnode}$ is determined as a heartbeat receiving node in which a follower data block corresponding to the current leader data block is located.

Step 61: Send heartbeat information of the heartbeat sending node to the heartbeat receiving node, where the heartbeat information of the heartbeat sending node carries a data block group identifier used to identify the data block group, and the data block group identifier is used to indicate that the leader data block in the data block group is located in the heartbeat sending node.

For each node in $node_{raftnode}$, the heartbeat sending node maintains a $leadermsg_r$ set. A format of an element in the $leadermsg_r$ set is a tuple (raftgroupID, leaderID), where raftgroupID is a data block group identifier, and leaderID is a node identifier of a node in which a leader data block is located. When the heartbeat sending node sends heartbeat information to a node in $node_{raftnode}$, a data block leader identifier(leaderID) in $leadermsg_r$ is added to the heartbeat information.

Figure 7:
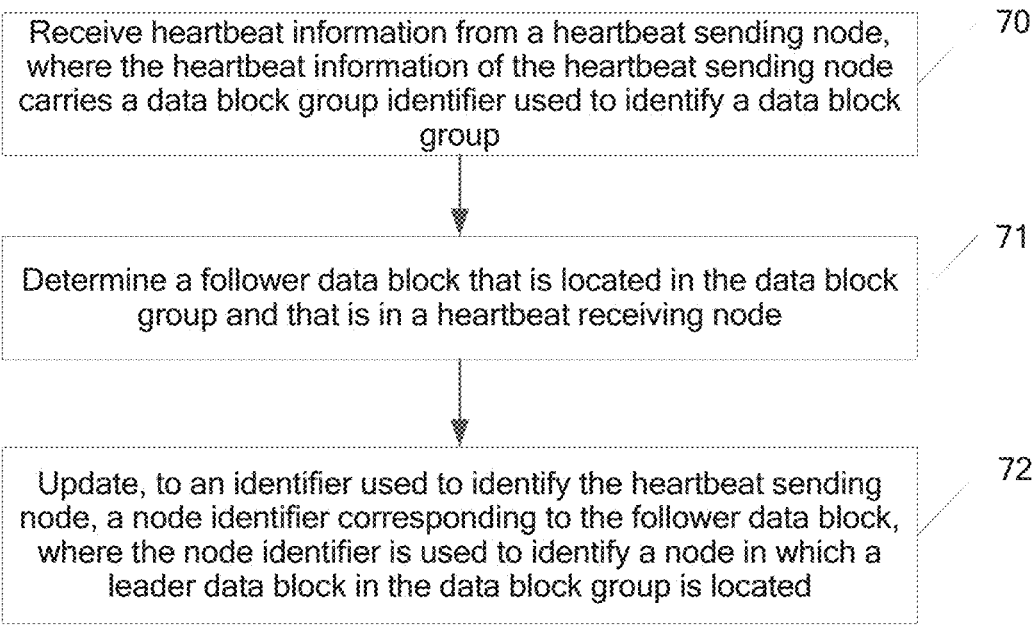
FIG. 7 is a flowchart of a heartbeat information processing method according to an embodiment of the present disclosure.

Referring to FIG. 7, after a heartbeat sending node sends, to a heartbeat receiving node, heartbeat information that carries a data block group identifier, the heartbeat receiving node performs the following steps.

Step 70: Receive heartbeat information from a heartbeat sending node, where the heartbeat information of the heartbeat sending node carries a data block group identifier used to identify a data block group.

Step 71: Determine a follower data block that is located in the data block group and that is in the heartbeat receiving node.

Each data block participating in a Raft algorithm has a unique data block group identifier of a data block group in which the data block is located. Therefore, the heartbeat receiving node determines, according to the data block group identifier carried in the heartbeat information, the follower data block that is located in the data block group. A data block group identifier of the follower data block is the same as the data block group identifier carried in the heartbeat information.

Step 72: Update, to an identifier used to identify the heartbeat sending node, a node identifier corresponding to the follower data block, where the node identifier is used to identify a node in which a leader data block in the data block group is located.

In step 72, if the node identifier corresponding to the follower data block is different from the identifier of the heartbeat sending node, the heartbeat receiving node updates, to the identifier of the heartbeat sending node, the node identifier corresponding to the follower data block. Then, when the heartbeat receiving node receives the heartbeat information sent by the heartbeat sending node, because an updated node identifier corresponding to the follower data block is the same as a node identifier carried in the heartbeat information, the follower data block can receive the heartbeat information and respond to the heartbeat information. Otherwise, the follower data block in the heartbeat receiving node is in isolation from the leader data block.

For example, still referring to graph b in FIG. 5, after the data block 1 in the node 1 changes from a leader data block to a follower data block, and the data block 1 in the node 3 becomes a leader data block of a data block group in which the data block 1 is located, a node identifier corresponding to the data block 1 in the node 2 is a node identifier of the node 1. The node 3 adds, to heartbeat information sent to the node 2, a data block group identifier used to identify the data block group in which the data block 1 is located. After receiving the heartbeat information sent by the node 3, the node 2 determines that a follower data block that is located in the data block group and that is in the node 2 is the data block 1, and updates, to a node identifier of the node 3, the node identifier corresponding to the data block 1.

If the node 1 continues to send heartbeat information to the node 2, because the node identifier corresponding to the data block 1 in the node 2 is updated to the node identifier of the node 3, when the node 2 receives the heartbeat information sent by the node 1, the data block 1 in the node 2 ignores the heartbeat information sent by the node 1. However, when the node 2 receives the heartbeat information sent by the node 3, the data block 1 in the node 2 receives the heartbeat information sent by the node 3, and responds to the heartbeat information sent by the node 3, so that after a status of the data block 1 in the node 3 changes, the data block 1 in the node 2 is not in isolation from the node 3.

Optionally, the heartbeat information of the heartbeat sending node is sent to the heartbeat receiving node when the heartbeat receiving node is a node that does not respond to an election request of the current leader data block.

Leader data block election in a Raft algorithm is first described.

In the Raft algorithm, any data block is in one of three states at any moment: a leader data block (leader), a follower data block (follower), or a candidate data block (candidate). In the Raft algorithm, a time period is divided into continuous terms, and leader data block election is performed when each term starts. When election is performed, a node in which a candidate data block is located starts a new timer, sends a RequestVote RPC request (an election request) to nodes in which all other data blocks that are located in a same data block group as the candidate data block are located, and waits for responses of the nodes. If before the timer times out, the node in which the candidate data block is located receives approval votes returned by a majority of nodes in a system, the data block candidate data block becomes a leader data block.

After leader data block election ends, it is assumed that the candidate data block becomes a current leader data block. If a heartbeat sending node in which the current leader data block is located receives no approval vote of a heartbeat receiving node in an election process, the heartbeat sending node sends, to the heartbeat receiving node, heartbeat information that carries a data block group identifier. If the heartbeat sending node receives, in the election process, an approval vote returned by a heartbeat receiving node, the heartbeat sending node may not send, to the heartbeat receiving node, heartbeat information that carries a data block group identifier.

Figure 8:
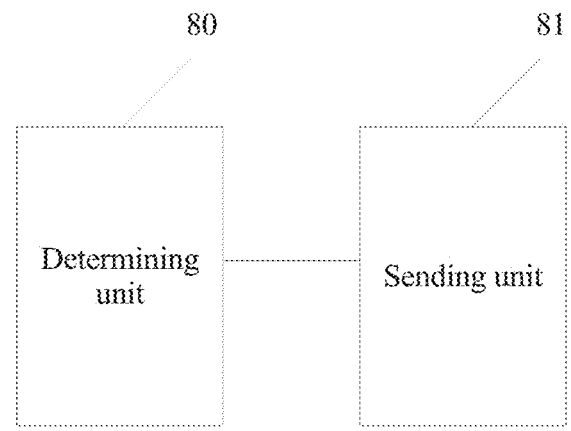
FIG. 8 is a schematic diagram of functional units of a heartbeat information sending apparatus according to an embodiment of the present disclosure.

Based on a same disclosure conception, an embodiment of the present disclosure further provides a heartbeat information sending apparatus. As shown in FIG. 8, the heartbeat information sending apparatus includes:

a determining unit 80, configured to determine heartbeat receiving nodes in which at least two follower data blocks corresponding to at least two leader data blocks in the heartbeat sending node are located; and a sending unit 81, configured to: when the heartbeat receiving nodes are a same node, send heartbeat information of the heartbeat sending node to the heartbeat receiving node, where the heartbeat information of the heartbeat sending node is heartbeat information obtained after respective heartbeat information of the at least two leader data blocks are combined.

Optionally, the heartbeat information of the heartbeat sending node carries data block group identifiers used to identify data block groups in which the at least two leader data blocks are respectively located, and the data block group identifiers are respectively used to indicate that the leader data blocks of the data block groups are located in the heartbeat sending node.

Various change manners and specific instances in the heartbeat information sending method in the embodiment shown in FIG. 4 are also applicable to the heartbeat information sending apparatus in this embodiment. According to the detailed description of the heartbeat information sending method, persons skilled in the art may clearly understand an implementation method of the heartbeat information sending apparatus in this embodiment. Therefore, for conciseness of the specification, details are not repeatedly described herein.

Figure 9:
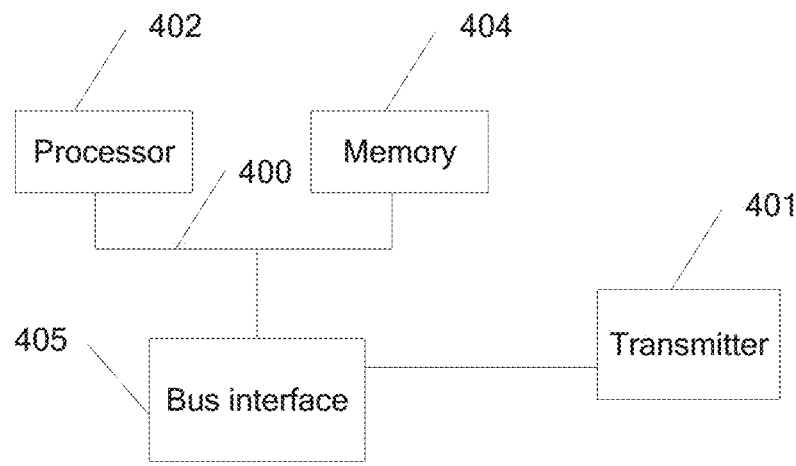
FIG. 9 is a schematic diagram of a hardware structure of a heartbeat sending node according to an embodiment of the present disclosure.

Based on a same disclosure conception, an embodiment of the present disclosure further provides a heartbeat sending node. As shown in FIG. 9, the heartbeat sending node includes a processor 402, a transmitter 401, and a communications bus 400. The processor 402 and the transmitter 401 communicate with each other by using the communications bus 400.

The processor 402 is configured to determine heartbeat receiving nodes in which at least two follower data blocks corresponding to at least two leader data blocks in the heartbeat sending node are located.

The transmitter 401 is configured to: when the heartbeat receiving nodes are a same node, send heartbeat information of the heartbeat sending node to the heartbeat receiving node. The heartbeat information of the heartbeat sending node is heartbeat information obtained after respective heartbeat information of the at least two leader data blocks are combined.

Optionally, the heartbeat information of the heartbeat sending node carries data block group identifiers used to identify data block groups in which the at least two leader data blocks are respectively located, and the data block group identifiers are respectively used to indicate that the leader data blocks of the data block groups are located in the heartbeat sending node.

Further, in FIG. 9, the communications bus 400 may include any quantity of interconnect buses and bridges. The communications bus 400 connects various circuits including one or more processors represented by the processor 402 and a memory represented by a memory 404. The communications bus 400 may further connect various other circuits such as a peripheral device, a voltage stabilizer, and a power management circuit. These are known in the art and are not further described in this specification. A bus interface 405 provides an interface between the communications bus 400 and the transmitter 401. The transmitter 401 may be a transceiver for providing a unit configured to communicate with various other apparatuses on a transmission medium.

The processor 402 is responsible for managing the communications bus 400 and general processing. The memory 404 may be configured to store data used when the processor 402 performs an operation.

Various change manners and specific instances in the heartbeat information sending method in the embodiment shown in FIG. 4 are also applicable to the heartbeat information sending apparatus in this embodiment. According to the detailed description of the heartbeat information sending method, persons skilled in the art may clearly understand an implementation method of the heartbeat information sending apparatus in this embodiment. Therefore, for conciseness of the specification, details are not repeatedly described herein.

Figure 10:
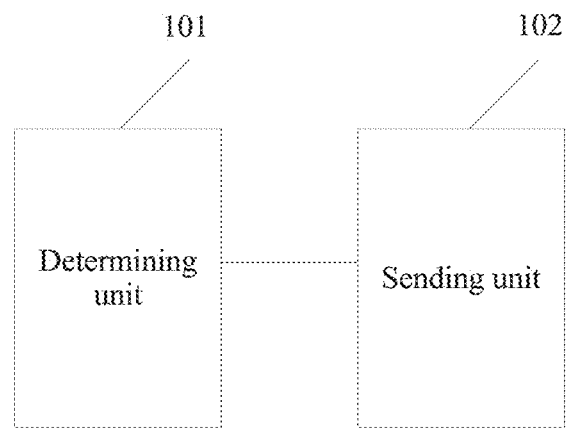
FIG. 10 is a schematic diagram of functional units of another heartbeat information sending apparatus according to an embodiment of the present disclosure.

Based on a same disclosure conception, an embodiment of the present disclosure further provides a heartbeat information sending apparatus. As shown in FIG. 10, the heartbeat information sending apparatus includes:

a determining unit 101, configured to determine a heartbeat receiving node in which a follower data block corresponding to a current leader data block in the heartbeat sending node is located, where a data block group in which the current leader data block is located includes the follower data block; and a sending unit 102, configured to send heartbeat information of the heartbeat sending node to the heartbeat receiving node, where the heartbeat information of the heartbeat sending node carries a data block group identifier used to identify the data block group, and the data block group identifier is used to indicate that the leader data block in the data block group is located in the heartbeat sending node.

Optionally, the sending unit 102 is configured to:

send the heartbeat information of the heartbeat sending node to the heartbeat receiving node when the heartbeat receiving node is a node that does not respond to an election request of the current leader data block.

Various change manners and specific instances in the heartbeat information sending method in the embodiment shown in FIG. 6 are also applicable to the heartbeat information sending apparatus in this embodiment. According to the detailed description of the heartbeat information sending method, persons skilled in the art may clearly understand an implementation method of the heartbeat information sending apparatus in this embodiment. Therefore, for conciseness of the specification, details are not repeatedly described herein.

Figure 11:
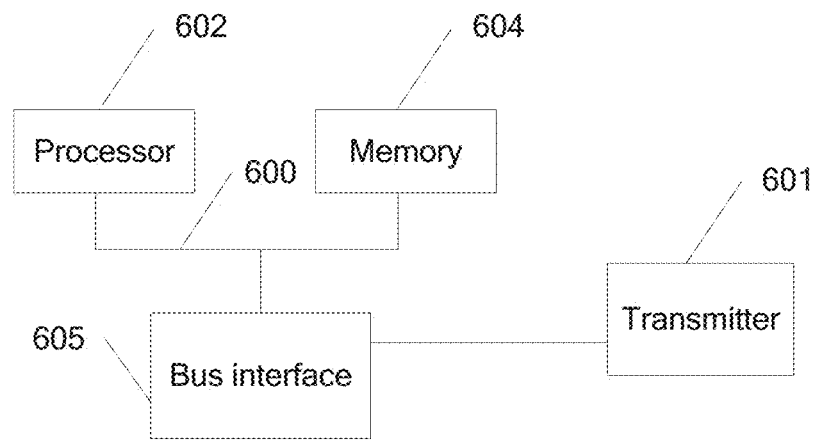
FIG. 11 is a schematic diagram of a hardware structure of another heartbeat sending node according to an embodiment of the present disclosure.

Based on a same disclosure conception, an embodiment of the present disclosure further provides a heartbeat sending node. As shown in FIG. 11, the heartbeat sending node includes a processor 602, a transmitter 601, and a communications bus 600. The processor 602 and the transmitter 601 communicate with each other by using the communications bus 600.

The processor 602 is configured to determine a heartbeat receiving node in which a follower data block corresponding to a current leader data block in the heartbeat sending node is located. A data block group in which the current leader data block is located includes the follower data block.

The transmitter 601 is configured to send heartbeat information of the heartbeat sending node to the heartbeat receiving node. The heartbeat information of the heartbeat sending node carries a data block group identifier used to identify the data block group, and the data block group identifier is used to indicate that the leader data block in the data block group is located in the heartbeat sending node.

Optionally, the transmitter 601 is configured to:

send the heartbeat information of the heartbeat sending node to the heartbeat receiving node when the heartbeat receiving node is a node that does not respond to an election request of the current leader data block.

Further, in FIG. 11, the communications bus 600 may include any quantity of interconnect buses and bridges. The communications bus 600 connects various circuits including one or more processors represented by the processor 602 and a memory represented by a memory 604. The communications bus 600 may further connect various other circuits such as a peripheral device, a voltage stabilizer, and a power management circuit. These are known in the art and are not further described in this specification. A bus interface 605 provides an interface between the communications bus 600 and the transmitter 601. The transmitter 601 may be a transceiver for providing a unit configured to communicate with various other apparatuses on a transmission medium.

The processor 602 is responsible for managing the communications bus 600 and general processing. The memory 604 may be configured to store data used when the processor 602 performs an operation.

Various change manners and specific instances in the heartbeat information sending method in the embodiment shown in FIG. 6 are also applicable to the heartbeat information sending apparatus in this embodiment. According to the detailed description of the heartbeat information sending method, persons skilled in the art may clearly understand an implementation method of the heartbeat information sending apparatus in this embodiment. Therefore, for conciseness of the specification, details are not repeatedly described herein.

Figure 12:
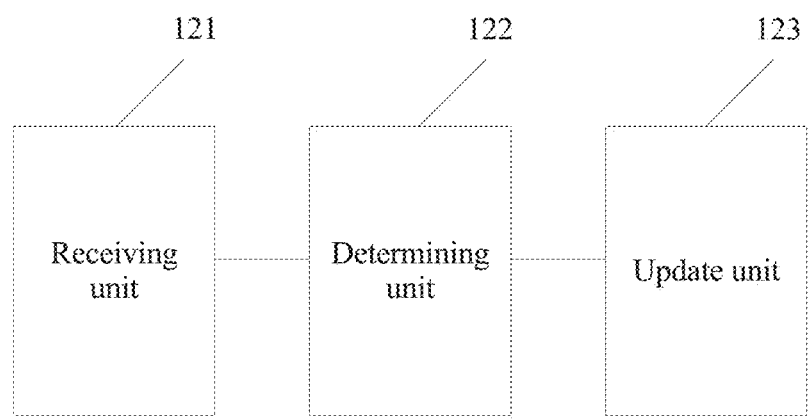
FIG. 12 is a schematic diagram of functional units of a heartbeat information processing apparatus according to an embodiment of the present disclosure.

Based on a same disclosure conception, an embodiment of the present disclosure further provides a heartbeat information processing apparatus. As shown in FIG. 12, the heartbeat information processing apparatus includes:

a receiving unit 121, configured to receive heartbeat information from a heartbeat sending node, where the heartbeat information of the heartbeat sending node carries a data block group identifier used to identify a data block group;

a determining unit 122, configured to determine a follower data block that is located in the data block group and that is in the heartbeat receiving node; and an update unit 123, configured to update, to an identifier used to identify the heartbeat sending node, a node identifier corresponding to the follower data block, where the node identifier is used to identify a node in which a leader data block in the data block group is located.

Various change manners and specific instances in the heartbeat information processing method in the embodiment shown in FIG. 7 are also applicable to the heartbeat information processing apparatus in this embodiment. According to the detailed description of the heartbeat information processing method, persons skilled in the art may clearly understand an implementation method of the heartbeat information processing apparatus in this embodiment. Therefore, for conciseness of the specification, details are not repeatedly described herein.

Figure 13:
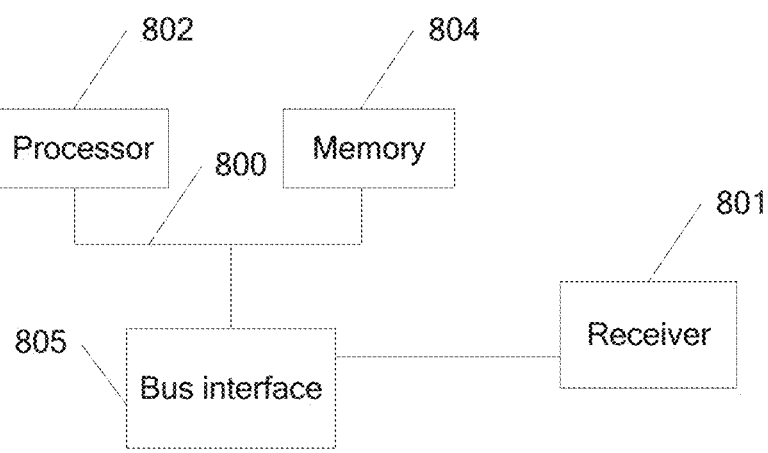
FIG. 13 is a schematic diagram of a hardware structure of a heartbeat receiving node according to an embodiment of the present disclosure.

Based on a same disclosure conception, an embodiment of the present disclosure further provides a heartbeat receiving node. As shown in FIG. 13, the heartbeat receiving node includes a processor 802, a receiver 801, and a communications bus 800. The processor 802 and the receiver 801 communicate with each other by using the communications bus 800.

The receiver 801 is configured to receive heartbeat information from a heartbeat sending node. The heartbeat information of the heartbeat sending node carries a data block group identifier used to identify a data block group.

The processor 802 is configured to: determine a follower data block that is located in the data block group and that is in the heartbeat receiving node; and update, to an identifier used to identify the heartbeat sending node, a node identifier corresponding to the follower data block. The node identifier is used to identify a node in which a leader data block in the data block group is located.

Further, in FIG. 13, the communications bus 800 may include any quantity of interconnect buses and bridges. The communications bus 800 connects various circuits including one or more processors represented by the processor 802 and a memory represented by a memory 804. The communications bus 800 may further connect various other circuits such as a peripheral device, a voltage stabilizer, and a power management circuit. These are known in the art and are not further described in this specification. A bus interface 805 provides an interface between the communications bus 800 and the receiver 801. The receiver 801 may be a transceiver for providing a unit configured to communicate with various other apparatuses on a transmission medium.

The processor 802 is responsible for managing the communications bus 800 and general processing. The memory 804 may be configured to store data used when the processor 802 performs an operation.

Various change manners and specific instances in the heartbeat information processing method in the embodiment shown in FIG. 7 are also applicable to the heartbeat information processing apparatus in this embodiment. According to the detailed description of the heartbeat information processing method, persons skilled in the art may clearly understand an implementation method of the heartbeat information processing apparatus in this embodiment. Therefore, for conciseness of the specification, details are not repeatedly described herein.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function specified in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a function specified in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function specified in one or more processes in the flowcharts and/or in one or more blocks in the block diagrams.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A heartbeat information sending method, wherein the method is performed by a heartbeat sending node, and the method comprises:
determining at least one heartbeat receiving node in which at least two follower data blocks are located, wherein the at least two follower data blocks correspond to at least two leader data blocks that are located in the heartbeat sending node, and wherein each follower data block and the corresponding leader data block belong to a same data block group; and
when the at least one heartbeat receiving node is a single node in which the at least two follower data blocks are located, sending heartbeat information of the heartbeat sending node to the single heartbeat receiving node, wherein the heartbeat information of the heartbeat sending node is a combination of heartbeat information of each of the at least two leader data blocks and wherein the heartbeat information of the heartbeat sending node does not include heartbeat information of at least one follower data block that is located in the heartbeat sending node.

2. The method according to claim 1, wherein the heartbeat information of the heartbeat sending node carries data block group identifiers that identify data block groups in which the at least two leader data blocks are respectively located, and the data block group identifiers respectively indicate that the leader data blocks of the data block groups are located in the heartbeat sending node.

3. A heartbeat information sending method, wherein the method is performed by a heartbeat sending node, and the method comprises:
determining a heartbeat receiving node in which one or more follower data blocks are located, wherein:
the one or more follower data blocks belong to a data block group and a first data block located in the heartbeat sending node is a current leader data block for the data block group,
a node identifier corresponding to the one or more follower data blocks incorrectly indicates that a second data block is the current leader data block for the data block group and that the second data block is located in a node other than the heartbeat sending node, and
each follower data block and the corresponding leader data block belong to a same data block group; and
sending heartbeat information of the heartbeat sending node to the heartbeat receiving node, wherein the heartbeat information of the heartbeat sending node carries a data block group identifier that identifies the data block group, and the data block group identifier indicates that the first data block is the current leader data block of the data block group.

4. The method according to claim 3, wherein the sending heartbeat information of the heartbeat sending node to the heartbeat receiving node comprises:
sending the heartbeat information of the heartbeat sending node to the heartbeat receiving node when the heartbeat receiving node is a node that does not respond to an election request for the election of the current leader data block as the leader of the data block group, wherein the election request is sent by the current leader data block in the heartbeat sending node.

5. A heartbeat sending node, comprising at least one processor, one or more memories coupled to the at least one processor, a transmitter, and a communications bus, wherein the processor and the transmitter communicate with each other by using the communications bus;
the one or more memories storing programming instructions for execution by the at least one processor to determine at least one heartbeat receiving node in which at least two follower data blocks are located, wherein the at least two follower data blocks correspond to at least two leader data blocks that are located in the heartbeat sending node, and wherein each follower data block and the corresponding leader data block belong to a same data block group; and
the transmitter is configured to: when the at least one heartbeat receiving node is a single node in which the at least two follower data blocks are located, send heartbeat information of the heartbeat sending node to the single heartbeat receiving node, wherein the heartbeat information is a combination of heartbeat information of each of the at least two leader data blocks and wherein the heartbeat information of the heartbeat sending node does not include heartbeat information of at least one follower data block that is located in the heartbeat sending node.

6. The heartbeat sending node according to claim 5, wherein the heartbeat information of the heartbeat sending node carries data block group identifiers that identify data block groups in which the at least two leader data blocks are respectively located, and the data block group identifiers respectively indicate that the leader data blocks of the data block groups are located in the heartbeat sending node.

7. A heartbeat sending node, comprising at least one processor, one or more memories coupled to the at least one processor, a transmitter, and a communications bus, wherein the processor and the transmitter communicate with each other by using the communications bus;
the one or more memories storing programming instructions for execution by the at least one processor to determine a heartbeat receiving node in which a follower data block is located, wherein:
the follower data block belongs to a data block group and a first data block located in the heartbeat sending node is a current leader data block for the data block group,
a node identifier corresponding to the follower data block incorrectly indicates that a second data block is the current leader data block and that the second data block is located in a node other than the heartbeat sending node, and each follower data block and the corresponding leader data block belong to a same data block group; and the transmitter is configured to send heartbeat information of the heartbeat sending node to the heartbeat receiving node, wherein the heartbeat information of the heartbeat sending node carries a data block group identifier that identifies the data block group, and the data block group identifier indicates that the first data block is the current leader data block of the data block group.

8. The heartbeat sending node according to claim 7, wherein the transmitter is configured to:

send the heartbeat information of the heartbeat sending node to the heartbeat receiving node when the heartbeat receiving node is a node that does not respond to an election request for the election of the current leader data block as the leader of the data block group, wherein the election request is sent by the current leader data block in the heartbeat sending node.

* * * * *